United States Patent
Yamamoto et al.

(10) Patent No.: US 6,291,105 B1
(45) Date of Patent: *Sep. 18, 2001

(54) BATTERY SEPARATOR AND METHOD FOR MANUFACTURING THE SAME AND BATTERY

(75) Inventors: Hiroyuki Yamamoto; Toyohiko Sano; Shuuji Hori; Tomofumi Tanaka; Tatsunori Kida, all of Hyogo (JP)

(73) Assignee: Daiwabo Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,568

(22) Filed: Aug. 14, 1998

(30) Foreign Application Priority Data

Aug. 19, 1997 (JP) .................................. 9-222780

(51) Int. Cl.$^7$ .................................. H01M 10/14
(52) U.S. Cl. ........................... 429/249; 429/250
(58) Field of Search ................... 429/249, 250

(56) References Cited

U.S. PATENT DOCUMENTS

| 5,609,976 | 3/1997 | Ueda et al. . |
| 6,080,471 | * 1/2000 | Shigematsu .................. 428/311.11 |

FOREIGN PATENT DOCUMENTS

| 57-141862 | 9/1982 | (JP) . |
| 2-276154 | 11/1990 | (JP) . |
| 7-142047 | 6/1995 | (JP) . |
| WO96/25771 | * 8/1996 | (WO) .................. H01M/2/16 |

OTHER PUBLICATIONS

Patent Abstracts of Japan, vol. 095, No. 009, Oct. 31, 1995 & JP 07 153441 A (Mitsubishi Paper Mills, Ltd.) Jun. 16, 1995.
Patent Abstracts of Japan, vol. 096, No. 002, Feb. 29, 1996 & JP 07 254399 A (Yuasa Corp.) Oct. 3, 1995.
Patent Abstracts of Japan, vol. 096, No. 003, Mar. 29, 1996 & JP 07 302583 A (Mitsubishi Paper Mills, Ltd.), Nov. 14, 1995.
Patent Abstracts of Japan, vol. 017, No. 460 (E–1419), Aug 23, 1993 & JP 05 109397 A (Kanai Juyo Kogyo Co., Ltd.) Apr. 30, 1993.

* cited by examiner

Primary Examiner—Gabrielle Brouillette
Assistant Examiner—Mark Ruthkosky
(74) Attorney, Agent, or Firm—Merchant & Gould P.C.

(57) ABSTRACT

A battery separator and a method for manufacturing the same and a battery using the same. The battery separator is excellent in alkaline retaining property, initial alkaline absorption and durable alkaline absorption while maintaining tensile strength and air permeability, by forming functional groups or bonds of —CHO or —C$^+$H—O$^-$, —CO—, and —COO— or —COO$^-$on the surface of the non-woven fabric. The battery shows great wettability with an alkaline electrolyte when incorporated into an battery, and thus, improves the battery life. The battery separator is provided by mixing and wet laid processing 15–75 weight % of splittable conjugated staple fibers comprising polyolefin polymer (component A) and ethylene vinyl alcohol copolymer (component B) arranged adjacent to each other when viewed in fiber cross section, 20–60 weight % of thermal bonding staple fibers, and 0–50 weight % of synthetic fibers that have greater fineness than that of ultra fine fibers formed by splitting the splittable bi-component fibers and have the same or smaller fineness than that of the thermal bonding fibers; treating the wet laid type non-woven fabric with high-pressure water flow to split the splittable bi-component fibers and to form the ultra fine fibers while entangling the fibers; treating both surfaces of the non-woven fabric with corona surface discharge, and calendering by heated rollers.

16 Claims, 3 Drawing Sheets

BATTERY SEPARATOR AND METHOD FOR MANUFACTURING THE SAME AND BATTERY

FIELD OF THE INVENTION

This invention relates to a battery separator suitable for alkaline storage batteries such as nickel-cadmium batteries, nickel-zinc batteries, and nickel-hydrogen batteries, a method for manufacturing the same, and a battery using the same.

BACKGROUND OF THE INVENTION

For battery separators, non-woven fabrics comprising nylon and polypropylene fibers are generally used. Some non-woven fabrics called dry laid type non-woven fabrics are manufactured by a dry laid process, while other non-woven fabrics manufactured by a wet laid process are called wet laid type non-woven fabrics. As non-woven fabrics comprising nylon fibers have poor alkaline resistance, non-woven fabrics comprising polyolefin-based fibers such as polypropylene are preferably used.

Such non-woven fabrics comprising polyolefin-based fibers are, however, hydrophobic, and thus, they have poor wettability when used for battery separators. Therefore, various methods for providing hydrophilicity to polyolefin-based non-woven fabrics have been proposed. One of the well-known examples is a treatment of applying hydrophilic surfactants to non-woven fabrics for hydrophilicity. Tokko-Hei (Published Examined Japanese Patent Application) No. 1-36231 discloses a non-woven fabric comprising sheath-core type bi-component fibers of polypropylene/polyethylene with which vinyl monomer is graft-copolymerized. Tokko-Hei 5-46056 discloses a polypropylene non-woven fabric with which fluorine gas is contact-reacted, and Tokkai-Hei (Published Unexamined Japanese patent Application) No. 7-142047 discloses that splittable bi-component fibers comprising polyolefin/ethylene vinyl alcohol copolymer and polyolefin-based fibers are mixed and processed, entangled by using high-pressure water flow, and treated with corona surface discharge.

The above-mentioned battery separators, however, have several problems. For instance, a battery separator manufactured by providing a hydrophilic surfactant to a non-woven fabric for hydrophilicity is superior in the initial alkaline absorption and alkaline retaining property, but the surfactant adhered to the surface of the non-woven fabric will be washed away because of the repeated charge and discharge of the battery. As a result, the wettability of the alkaline electrolyte will be greatly lowered, and the battery life will be shortened.

The battery separators disclosed in Tokko-Hei 1-36231 and Tokko-Hei 5-46056 have non-woven fabrics having surfaces modified to provide hydrophilicity in order to improve durable hydrophilicity. These separators, however, require special work and the processability and productivity are poor, resulting in increased cost. Therefore, the separators are not practical.

Tokkai-Hei 7-142047 discloses a battery separator comprising 75–100 weight % of splittable bi-component fibers comprising hydrophobic polyolefin polymer and hydrophilic ethylene vinyl alcohol copolymer. Although the durable hydrophilicity of the fibers is improved by treating with corona charge for providing hydrophilic groups, the air permeability of the non-woven fabric is low due to the excessively small fiber gaps, and thus, the gas permeability required for a sealed battery is inferior.

SUMMARY OF THE INVENTION

This invention aims to provide a battery separator that has great alkaline absorption, alkaline retaining property and proper air permeability, which will improve the battery capacity without reducing the battery life, and also provide a battery with superior battery properties.

In order to achieve the purpose, a battery separator of this invention comprises a mixture of staple fibers comprising at least:

15–75 weight % of splittable bi-component fibers comprising polyolefin polymer (component A) and polyolefin polymer containing oxygen atoms (component B) that are arranged adjacent to each other when viewed in fiber cross-section;

20–60 weight % of thermal bonding fibers; and

0–50 weight % of synthetic fibers having greater fineness (i.e. the fibers are thicker) than that of ultra fine fibers formed by splitting the above-identified splittable bi-component fibers;

wherein the splittable bi-component fibers are split to form ultra fine fibers as the fibers are entangled and partially bonded to each other; and functional groups are present in the fibers on the surface of the non-woven fabric, and the percentage of the functional groups or the bonds to all the carbon atoms on the non-woven fabric is within the following range.

(1) Aldehyde groups (—CHO) or aldehyde bonds (—C$^+$H—O$^-$): 10–40%

(2) Carbonyl groups or carbonyl bonds (—CO—): 3–30%

(3) Carboxyl groups (—COO$^+$) or ester bonds (—COO—): 0–15%

(4) Residual carbon atoms: 15–87%

It is preferable in the battery separator of the invention that the fiber length of the splittable bi-component fibers, thermal bonding fibers and the synthetic fibers ranges from 3 to 25 mm, and the fineness of the synthetic fibers is preferably the same or smaller than that of the thermal bonding fibers.

It is also preferable in the battery separator that the air permeability ranges from 5 to 50 ccs.

It is also preferable in the battery separator that the alkaline absorption height (durable alkaline absorption) at a third time is no less than 5 mm.

It is also preferable in the battery separator that the thermal bonding fibers are sheath-core type bi-component fibers whose sheath is polyethylene and whose core is polypropylene.

It is also preferable in the battery separator that the non-woven fabric is a composite non-woven fabric manufactured by laminating fiber webs of various fiber lengths.

It is also preferable in the battery separator that at least one sheet is laminated on at least one layer of the non-woven fabric.

It is also preferable in the battery separator that the component B is at least one polymer selected from the group consisting of ethylene vinyl alcohol copolymer, ethylene-(meth)acrylate copolymer, ethylene-(meth)acrylic acid copolymer and ethylene-vinyl acetate copolymer.

A method for manufacturing a battery separator of this invention comprises the steps of:

mixing and wet laid processing 15–75 weight % of splittable bi-component fibers 3–25 mm in length comprising polyolefin polymer (component A) and polyolefin polymer containing oxygen atoms (component B) that are arranged adjacent to each other when viewed in fiber cross-section, 20–60 weight % of thermal bonding fibers 3–25 mm in length, and 0–50 weight % of synthetic fibers 3–25 mm in length whose fineness is greater than that of ultra fine fibers formed by splitting the splittable bi-component fibers and is the same or smaller than that of the thermal bonding fibers in order to form a wet laid type non-woven fabric;

splitting the splittable bi-component fibers to form ultra fine fibers and to entangle the fibers in at least one step selected from the group consisting of wet laid process and a step following the formation of the wet laid type non-woven fabric; and treating both the surfaces of the non-woven fabric with corona surface discharge and calendering by heated rollers.

It is preferable in the method that the splittable bi-component fibers are split by the impact provided by the stirring in the wet laid process.

It is preferable in the method that the splittable bi-component fibers are split by high-pressure water flow treatment.

It is preferable in the method that the split-formed ultra fine fibers are entangled by high-pressure water flow treatment.

It is preferable in the method that the split of the splittable bi-component fibers and the entanglement of the then-formed ultra fine fibers are conducted simultaneously by high-pressure water flow treatment.

It is preferable in the method that the total discharge amount to treat both the surfaces of the non-woven fabric with the corona surface discharge ranges from 0.05 to 5 kW·minute/m$^2$.

It is also preferable in the method that a hydrophilic surfactant is applied to the non-woven fabric after the corona surface discharge treatment.

It is also preferable in the method that the component B is at least one polymer selected from the group consisting of ethylene vinyl alcohol copolymer, ethylene-(meth)acrylate copolymer, ethylene-(meth)acrylic acid copolymer and ethylene-vinyl acetate copolymer.

In the above-mentioned method, a battery separator with excellent alkaline absorption, alkaline retaining property and proper air permeability is obtained, and the separator will improve the battery capacity without reducing the battery life.

A battery of this invention is characterized in that the battery separator of this invention is incorporated into the battery.

DETAILED DESCRIPTION OF THE INVENTION

Splittable bi-component fibers used for a battery separator of this invention comprise polyolefin polymer (component A) and polyolefine polymer containing oxygen atoms (component B). Polypropylene and polyethylene are preferably used for the former polyolefin polymer (component A). For the latter polyolefin polymer containing oxygen (component B), at least one kind of polymer or the like can be selected from the group consisting of ethylene vinyl alcohol copolymer, ethylene-(meth)acrylate copolymer, ethylene-(meth)acrylic acid copolymer and ethylene-vinyl acetate copolymer. Among the copolymers, ethylene vinyl alcohol copolymer is excellent when considering the melting point and processability. Taking spinnability and hydrophilicity into consideration, ethylene vinyl alcohol copolymer comprising 20–50 mol % of ethylene is preferably used.

Figure 1:
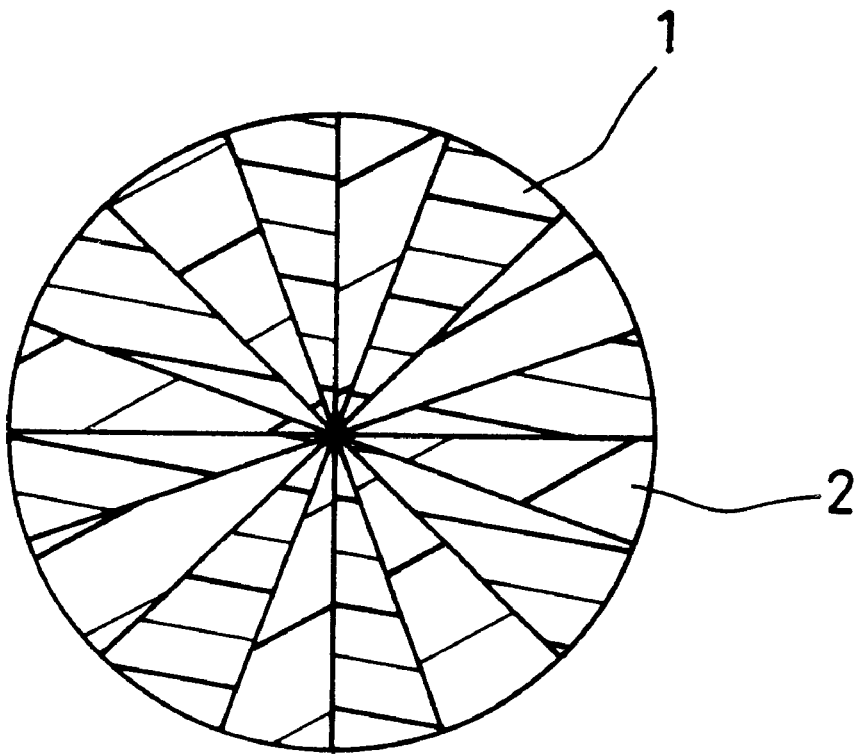
FIG. 1 is a magnified cross-sectional view of a splittable bi-component fiber applicable for this invention.
Figure 2:
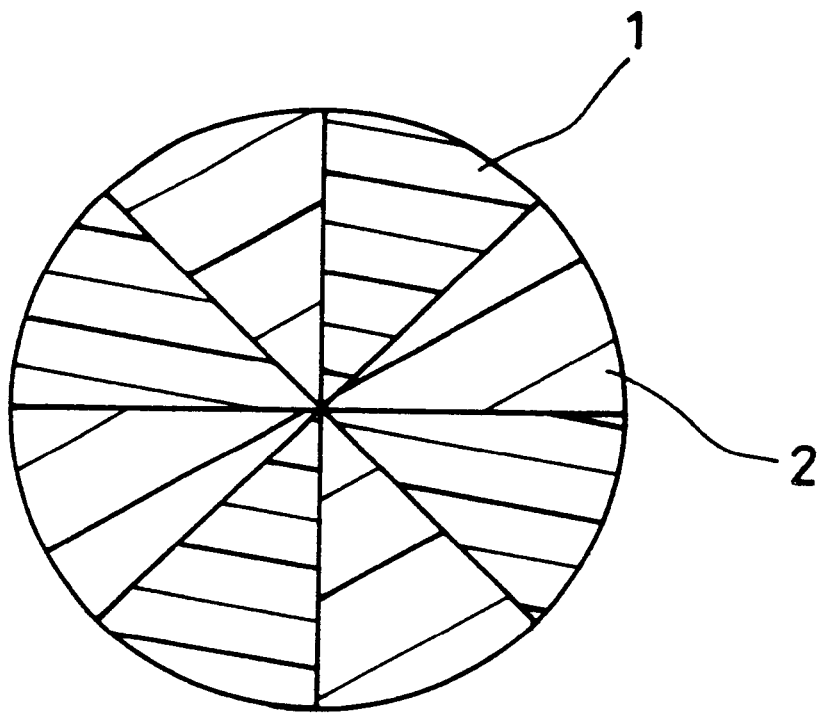
FIG. 2 is a magnified cross-sectional view of another splittable bi-component fiber applicable for this invention.
Figure 3:
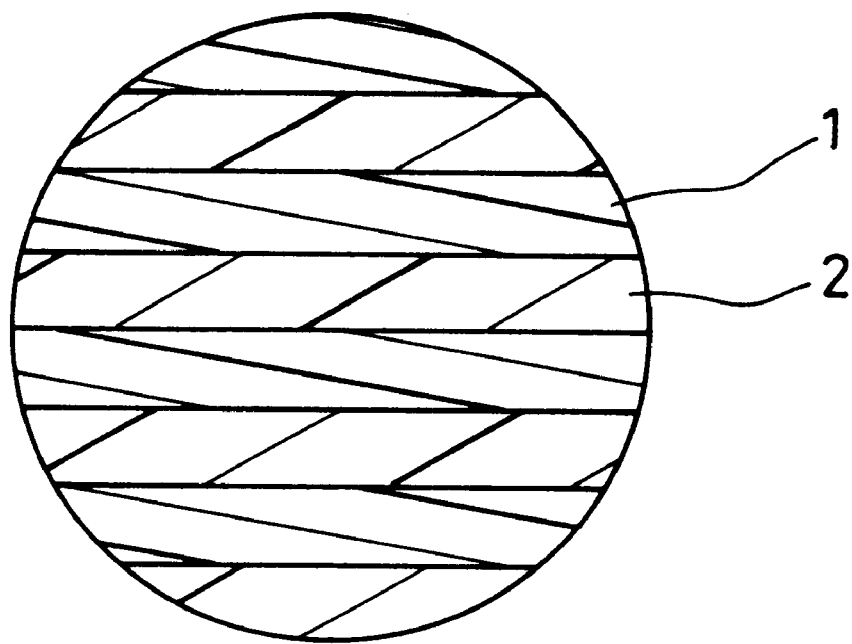
FIG. 3 is a magnified cross-sectional view of still another splittable bi-component fiber applicable for this invention.

The splittable bi-component fiber comprises components A and B adjacent to each other when viewed in the cross-section of the fiber, the composing units are continuous in the longitudinal direction, and at least one part of each unit is exposed to the fiber surface when viewed in the cross section. For example, fibers having components A and B arranged as shown in FIGS. 1–3 are preferably used. In FIGS. 1–3, numeral 1 represents component A and numeral 2, component B. The preferable conjugation ratio of component A to component B is from 30:70 to 70:30 in weight, considering the facility in spinning process and wettability to an alkaline alkaline electrolyte.

The splittable bi-component fibers are split in the later-mentioned treatments such as a wet laid process or high-pressure water flow treatment. When the ratio of the ultra fine fibers formed from the splittable bi-component fibers is excessive in the non-woven fabric, or when the fineness of the ultra fine fibers is excessively small, the fiber gaps formed due to the entanglement and bonding among the fibers composing the non-woven fabric become too small, and the properties such as air permeability and alkaline retaining property will deteriorate. In order to avoid such problems, the preferable ratio of the splittable bi-component fibers in the fabric is from 15–75 weight %, or more preferably, 40–60 weight %. It is also desirable that the fineness of the ultra fine fibers formed from the splittable bi-component fibers ranges from 0.1 to 0.5 denier. When the ratio of the splittable bi-component fibers is less than 15 weight %, the ratio of the ethylene vinyl alcohol copolymer is also decreased. As a result, not only is the hydrophilicity spoiled, but the fiber gaps grow to lower the alkaline retaining property and alkaline absorption. When the ratio exceeds 75 weight %, not only is the air permeability lowered, but the proccessability deteriorates since ethylene vinyl alcohol copolymer resin adheres to the surface of the dryer or blanket during a drying step in the wet laid process. Furthermore, as the properties rely on the entanglement of the ultra fine fibers, several problems will occur, such as the non-woven fabric is too soft (that is, the non-woven fabric has poor toughness), or the winding property for incorporating into a battery is poor due to the great longitudinal elongation of the non-woven fabric. When the fineness of the ultra fine fibers exceeds 0.5 denier, fiber gaps will grow excessively and the alkaline absorption and alkaline retaining property deteriorate. Fibers of less than 0.1 denier are not preferable since the air permeability is lowered.

The thermal bonding fibers in this invention will be softened and melted by heat and function as a binder for the fibers. Preferable examples of such fibers include polyolefin-based thermal bonding fibers such as polyethylene and polypropylene.

It is specifically preferable in this invention that sheath-core type bi-component fibers comprising a sheath of a component having a low melting point and a core of a component having high melting point are used to improve the separator strength. The components include, for instance, polypropylene/ethylene-vinyl alcohol copolymer, polypropylene/polyethylene, polypropylene/ethylene-propylene copolymer, polypropylene/ethylene-methyl acrylate copolymer, and polypropylene/ethylene-vinyl acetate copolymer. Among them, sheath-core type bi-component fibers comprising a core of polypropylene and a sheath of polyethylene are most preferable, since the fibers comprising a polyolefin-based component have good alkaline resistance, and the bondability with splittable bi-component fibers comprising polypropylene and ethylene vinyl alcohol copolymer is good. The preferable ratio of the core component to the sheath component generally ranges from about 30:70 to 70:30 in weight. The fineness of the thermal bonding fibers is preferably from 0.5 to 5 denier. When it is less than 0.5 denier, the fibers will not be well dispersed in a slurry during a wet laid process, and the fibers will be entangled with each other, and thus, processability and quality will deteriorate. When it exceeds 5 denier, the fiber gaps will grow excessively, resulting in a short-circuit during assembly of a battery.

It is preferable that the amount of thermal bonding fiber in the fabric is 20–60 weight %, or more preferably, 20–40 weight %. If the ratio is less than 20 weight %, the bonding among the fibers is insufficient, resulting in poor strength of the non-woven fabric and winding property. If it exceeds 60 weight %, excessive areas will be bonded, and thus, the fiber gaps will be decreased, resulting in poor alkaline absorption and alkaline retaining property.

It is preferable that 0–50 weight % of synthetic fibers are mixed with the battery separator of this invention in order to maintain fiber gaps among the fibers. The synthetic fibers have greater fineness than that of the ultra fine fibers formed by splitting the splittable bi-component fibers, while the fineness is the same or smaller than that of the thermal bonding fibers. More preferably, the mixing ratio is from 0–30 weight %, or further preferably, 10–20 weight %. It is preferable that the fineness ranges from 0.5 to 5 denier. The synthetic fibers can be selected from commonly-used ones such as polypropylene, polyester and nylon, which will not be substantially melted at a melting point of the thermal bonding fibers. When 20–50 weight % of synthetic fibers with hydrophilicity and optional functions are mixed, the durable hydrophilicity is improved due to the surface modification and, together with the hydrophilicity and the optional functions of the synthetic fibers, superior battery properties are obtained. It is not preferable that the synthetic fibers are present in more than 50 weight %, since the bonding area is too small and the strength of the non-woven fabric is decreased. When the fineness of the synthetic fiber exceeds 5 denier, minute fiber gaps cannot be maintained inside the non-woven fabric. On the other hand, the fibers will be entangled with each other in a wet laid process when the fineness is less than 0.5 denier, and as a result, the processability and quality will deteriorate. In particular, polypropylene fibers of 0.6–1.2 denier having proper stiffness and high strength are used most preferably in order to provide alkaline resistance to the separator and to maintain proper fiber gaps.

The fiber length of the above splittable bi-component fibers, synthetic fibers and thermal bonding fibers is preferably 3–25 mm, though it is not specifically limited. More preferably, it ranges from 5–15 mm. When the length is less than 3 mm, the fibers will spatter during high-pressure water flow treatment and sufficient entanglement cannot be obtained, which is not preferable for the process. When the length exceeds 25 mm, dispersibility of the fibers in a slurry deteriorates when manufacturing a non-woven fabric specifically by a wet laid process, and uniform non-woven fabric cannot be obtained.

The non-woven fabric is not limited to the above composite fabric, but it can also be laminated by varying the mixing rate of the fibers within the above-identified range, or by laminating fiber webs having different fiber length. As an example for the latter composite fabric, a fiber web comprising staple fibers at least 30 mm long or a filament web can be laminated on at least one surface of another fiber web comprising fibers 3–25 mm in length prepared by a wet laid process. When fiber webs of different fiber length are laminated, the fiber web having shorter fibers improves the minuteness of the non-woven fabric, while the web having longer fibers will improve the strength of the non-woven fabric. As a result, the productivity for incorporation into a battery can be raised. These fiber webs can be, for example, uncombined webs such as a carding web, combined non-woven fabrics prepared by partially bonding the contained fibers with a binder or by using self-binding, or a non-woven fabric prepared by entangling by a needle punching or high-pressure water flow treatment. For lamination, the uncombined webs can be laminated before entangling the fibers, or the fibers can be entangled after at least one of the fiber webs is processed to be a non-woven fabric by the way for the combination or entanglement mentioned above and laminated.

It is further possible that at least another sheet is laminated on at least one layer of the non-woven fabric. The sheet may be a wet laid type non-woven fabric comprising fibers 3–25 mm in length, a combined non-woven fabric manufactured by bonding partially the fibers at least 30 mm in length by using a binder or the self-binding, a non-woven fabric made by entangling with a needle punch or high-pressure water flow, or a porous film. When using a wet laid type non-woven fabric of 3–25 mm long fibers for the sheet, a non-woven fabric with less basis weight is obtainable. The fabric has less through holes, so that the short circuit rate in a battery can be reduced. The tensile strength can be further improved by using fibers at least 30 mm in length or a porous film. The material for the sheet is not specifically limited but some resins such as polyolefin-based resin, polyamide-based resin, or polyester-based resin can be used. The method for lamination is not specifically limited as the sheet is laminated on at least one layer. More specifically, the sheet can be laminated on one surface of the non-woven fabric or both the surfaces of the fabric, or be inserted between the non-woven fabrics.

It is possible that at least two laminates are provided. The method for combining the layers is not specifically limited, but several methods can be used. For instance, a non-woven fabric prepared by high-pressure water flow treatment is laminated with another sheet before combining them with a heat treatment such as heated air and heated rollers, or a fiber web of this invention, which is previously laminated with another sheet, can be combined by using high-pressure water flow.

As a result, a non-woven fabric is provided, in which splittable bi-component fibers, synthetic fibers and thermal bonding fibers are mixed with each other, ultra fine fibers are formed by splitting the bi-component fibers, and the fibers are entangled and partially bonded to each other.

Moreover, functional groups are present in the fibers on the surface of the non-woven fabric, and the percentage of the functional groups or the bonds to the all carbon atoms on the non-woven fabric is within the following range.

(1) Aldehyde groups (—CHO) or aldehyde bonds (—C$^+$H—O$^-$): 10–40%

(2) Carbonyl groups or carbonyl bonds (—CO—): 3–30%

(3) Carboxyl groups (—COO$^-$) or ester bonds (—COO—): 0–15%

(4) Residual carbon atoms: 15–87%

The functional groups can be measured by analyzing the surface element composition of the non-woven fabric through electron spectroscopy for chemical analysis (ESCA), separating the functional groups from the total carbon atoms amount on the non-woven fabric at the respective peaks and comparing the area ratio.

Regarding the functional groups of the non-woven fabric comprising the above-mentioned fibers, —CO— or —COO— increases by modifying the surface of the non-woven fabric. The durable hydrophilicity will deteriorate when —CHO or —C$^+$H—O$^-$ is less than 10% and —CO— is less than 3%. On the other hand, when —CHO/—C$^+$H—O$^-$, —CO—, and —COO—/—COO$^-$ exceeds 40%, 30% and 15% respectively, the durable hydrophilicity is good but the strength of the fibers deteriorates and the strength of the non-woven fabric will also deteriorate.

The air permeability of the obtained battery separator is preferably from 5 to 50 ccs, more preferably, 10–25 ccs. The air permeability can be adjusted according to several factors such as mixing ratio of the splittable bi-component fibers, synthetic fibers and thermal bonding fibers; the condition for the high-pressure water flow treatment; and heat treatment temperature.

By adjusting the air permeability to be 5–50 ccs, proper fiber gaps are maintained in the battery separator, and together with the improvement of durable hydrophilicity due to the surface modification, an alkaline electrolyte is kept inside the battery and good alkaline retaining property is provided.

The alkaline absorption height at the third time for the obtained battery separator (durable alkaline absorption height) is preferably 5 mm or more, more preferably at least 15 mm. If the durable alkaline absorption height is at least 5 mm, the durable hydrophilicity is great and a battery with long life can be obtained.

The alkaline retaining rate of the obtained battery separator is preferably at least 300%, more preferably, at least 400%. An alkaline retaining rate of less than 300% is not preferable since the battery's life will be reduced because of the dryout of the separator incorporated into the battery due to the repeated charge and discharge.

The longitudinal elongation of the obtained battery separator is preferably no more than 30%, or more preferably, no more than 20%. Elongation over 30% is not preferable since the separator's width is overly shortened with respect to the predetermined length if it is wound with longitudinal tension in the step of incorporating the separator into a battery.

A method for manufacturing a battery separator of this invention is as follows. A wet laid process is preferable for manufacturing a non-woven fabric to be used for the separator of this invention, since a uniform non-woven fabric can be obtained. Normal steps of the wet laid process can be used. More specifically, 15–75 weight % of splittable bi-component fibers, 20–60 weight % of thermal bonding fibers, and 0–50 weight % of synthetic fibers are mixed and dispersed in water to have a concentration of 0.01–0.6% in order to prepare a slurry. Small amount of dispersants can be added at this time. The splittable bi-component fibers can be previously split during the preparation of slurry, or the splitting can be delayed until a later high-pressure water flow treatment.

The slurry is processed by using a wet laid paper machine or the like, such as a short wire former, a cylinder wire former, or a combination thereof. The preferable basis weight ranges from 30 to 100 g/m$^2$ while it can be adjusted depending on the fiber amount. The strength of a non-woven fabric will deteriorate when the basis weight is less than 30 g/m$^2$ and thus, the short circuit easily occurs between the anode and cathode, while the air permeability deteriorates with the basis weight over 100 g/m$^2$.

Subsequently the thermal bonding fibers are melted to slightly bond the fibers. The melting step can be conducted at the time of drying in the paper manufacturing process, or the thermal bonding fibers can be heated after a wet laid type non-woven fabric is prepared. The fibers are slightly bonded with each other by melting the thermal bonding fibers, and treated with high-pressure water flow after stabilizing the form. As a result, ultra fine fibers are formed by splitting the splittable bi-component fibers and the fibers are entangled. In the high-pressure water flow treatment, high-pressure columnar water flows are injected to both sides of the non-woven fabric at least once respectively with a water pressure of 25–150 kg/cm$^2$ from a nozzle having orifices of 0.05–0.5 mm diameter provided at a spacing of 0.5–1.5 mm.

Subsequently, both sides of the non-woven fabric are treated with corona surface discharge for the purpose of surface modification. It is preferable that the corona surface discharge frequency is 1–20 times for each surface of the non-woven fabric, and the total discharge amount ranges from 0.05 to 5kW·minute/m$^2$, more preferably, 0.1 to 3 kW·minute /m$^2$. When the total discharge amount is less than 0.05 kW·minute/m$^2$, sufficient durable hydrophilicity cannot be obtained. A total discharge amount over 5 kW·minute/m$^2$ is not preferable since the strength of the fibers deteriorates, and the strength of the non-woven fabric deteriorates.

It is further effective if hydrophilic surfactants are supplied to the non-woven fabric after the corona surface discharge treatment, since the initial hydrophilicity is improved. The hydrophilic surfactants include phosphoric acid-based anion activators such as alkylphosphonate, soap-based anion activators such as aliphatic carboxylic acid soap, and sulfate-based anion activators such as alkyl sulfate. The surfactants are uniformly adhered by some methods such as impregnation, spraying and roll-touching. After that, the non-woven fabric provided with the surfactants is dried by a known method. The non-woven fabric is calendered by heated rollers, adjusted to have a predetermined thickness, and thus, a battery separator of this invention is obtained.

This invention will be further described referring to Examples. The factors in the Examples (thickness, tensile strength, elongation, air permeability, alkaline retaining ability, initial alkaline absorption height, durable alkaline absorption height, and the functional groups on the non-woven fabric fiber surface composing the separator) were measured in the following ways.

(1) Thickness was measured under the condition of applying 20 g of load for a sample piece of 1 cm$^2$, by using a thickness measuring instrument (Trade name: THICKNESS GAUGE Model CR-60A made by DAIEI KAGAKUSEIKI SEISAKUSHO LTD).

(2) Tensile strength and elongation were measured under the condition specified in JIS L 1096, more specifically, holding sample pieces 5 cm in width and 15 cm in length at a spacing of 10 cm, extending the pieces at a tensile speed of 30 cm/minute by using a constant rate extension tensile tester, so that the loading value and extension rate at rupture were indicated as tensile strength and elongation respectively.

(3) Air permeability was measured by using a Flagyl tester under the condition specified in JIS L 1096.

(4) Alkaline retaining rate was measured by the following steps of: weighing (W) the sample pieces to the accuracy of 1mg at moisture equilibrium; impregnating the sample pieces in a potassium hydroxide solution (a KOH solution) with relative density of 1.30 for one hour in order to absorb the solution; taking out the sample pieces and leaving them for 10 minutes; weighing the pieces ($W_1$); and calculating the alkaline retaining rate from the following formula:

$$\text{Retaining rate}(\%)=((W_1-W)/W)\times 100 \quad \text{(Formula 1)}$$

(5) Initial alkaline absorption height was measured in the following steps of: collecting three sample pieces (25 mm×250 mm) in the width direction and letting them reach moisture equilibrium; fixing the pieces with pins to horizontal bars that were supported at a predetermined level above a tank containing a KOH solution with a relative density of 1.30 and kept at 20° C.; lowering the horizontal bars while arranging the lower ends of the pieces in a line so that the lower ends of the pieces were impregnated in the solution by 5 mm; and measuring after 30 minutes the height that the KOH solution rose because of the capillary phenomenon.

(6) Durable alkaline absorption height was measured by the following steps of: rinsing the sample pieces used for measurement of the initial alkaline absorption height (first alkaline absorption height) with water for five minutes, dehydrating with a blotter, and air-drying for about one hour; allowing the pieces to reach moisture equilibrium under an atmosphere of humidity of 65% at a room temperature (20° C.), and measuring the alkaline absorption height for a second time; and repeating the above operations and measuring the third alkaline absorption height (durable alkaline absorption height).

(7) Functional groups on non-woven fabric fibers for a separator were measured from an analysis of elemental composition on the non-woven fabric by using an ESCA-3300 Model made by Shimadzu Corporation. More specifically, the rate of all elemental carbon and functional groups contained in the olefin main chains and sub-chains existing on the non-woven fabric surface was measured under the following condition : the radiation source was Mg/Al whose output was 8 kw, 30 mA; the measurement area of the non-woven fabric was 5 mm×10 mm; and the depth from the fabric surface was 100 angstrom (10 nm). ESCA, or Electron Spectroscopy for Chemical Analysis is used in a measurement for structure studies and chemical analyses of atoms, molecules or solid matters by irradiating the samples with monochromatic X-ray flux and measuring the emitted photoelectron energy.

(8) A cylindrical sealed nickel hydrogen battery was prepared as follows. First, a metal hydride cathode was formed by adding water to metal hydride, carbonyl nickel, carboxymethyl-cellulose (CMC), and polytetrafluoroethylene (PTFE), kneading the material in order to prepare a slurry, impregnating and applying the slurry to a nickel-plated punching metal and drying it at 80° C., and pressure-molding. A known sintered nickel pole was used for the anode. Then, each separator was sandwiched between the anode and cathode and inserted into a battery case canister, and an alkaline alkaline electrolyte was injected therein.

(9) Cycle life was calculated in the following way. The above-mentioned Ni-MH battery was initially activated by repeating ten cycles of charge-discharge, and one cycle comprises the steps of: charging for 12 hours at a rate of 0.1 c, pausing for 0.5 hour, and discharging at a rate of 0.1 c (final voltage was 10V). After the initial activity, the following cycle was repeated at 20° C. until the conservation rate to the theoretical capacity was 90% or lower, and the cycle number indicated the cycle life. One cycle consists of charging for ten hours at a rate of 0.1 c, pausing for 0.5 hour, and discharging at a rate of 0.1 c (final voltage was 1.0V).

(10) Internal pressure was measured in the following way. A battery was assembled and a hole was formed on the bottom of the battery canister and a pressure sensor was adhered. After initial activity, five cycles of charge-discharge were repeated by using this battery. One cycle consists of charging for 16 hours at a rate of 0.1 c, pausing for 0.5 hour, and discharging at a rate of 0.1 c (final voltage was 1.0V). After charging for 120 minutes at a rate of 1.0 c, the voltage was measured.

(11) Short circuit rate was calculated as a percentage of short circuit when 100 cylindrical sealed nickel hydrogen batteries were assembled.

EXAMPLE 1

In order to obtain a non-woven fabric for a battery separator, 30 weight % of thermal bonding fibers as sheath-core type bi-component fibers of 1.5 denier and 10 mm long, 50 weight % of splittable bi-component fibers of 3 denier and 6 mm long, and 20 weight % of polypropylene fibers of 0.7 denier and 10 mm long were mixed for preparing a slurry of 0.5% concentration, and for forming a wet laid type non-woven fabric of 55 g/m² basis weight by a wet laid process. The thermal bonding fibers (sheath-core type bi-component fibers) comprised polypropylene (core component) and high density polyethylene (sheath component) at a conjugation weight ratio of 50/50. The splittable bi-component fibers had a cross section as shown in FIG. 1, comprised component A (polypropylene) and component B (ethylene vinyl alcohol copolymer comprising 38 mol % of ethylene). The area rate of component A to component B was 50/50. Next, high-pressure columnar water flow was injected with a water pressure of 130 kg/cm² to the surface and backside of the wet laid type non-woven fabric, so that the splittable bi-component fibers were split to form ultra fine fibers of 0.19–0.2 denier and the fibers were entangled, then the fibers were dried and simultaneously, thermally bonded at 135° C. Sequentially, both surfaces of the non-woven fabric were treated with corona surface discharge for respectively four times so that the total discharge amount was 0.462 kW·minute/m², and calendered by heated rollers.

EXAMPLE 2

A non-woven fabric for a battery separator was obtained through the same treatment as Example 1, except for adhering 0.2 weight % of an alkyl phosphonate ester-based surfactant to the fabric.

EXAMPLE 3

A fiber web of 20 g/m² basis weight was manufactured by mixing 30 weight % of thermal bonding fibers of 1.5 denier and 45 mm long, 50 weight % of splittable bi-component fibers of 3 denier and 51 mm long, and 20 weight % polypropylene fibers of 1.2 denier and 45 mm long, processing with a semi-random carding machine. The thermal bonding fibers were sheath-core type bi-component fibers comprising polypropylene as the core component and high density polyethylene as the sheath component, and the conjugation weight ratio was 50/50. The splittable bi-component fibers had a cross section as shown in FIG. 1, comprised component A (polypropylene) and component B (ethylene vinyl alcohol copolymer comprising 38 mol % of ethylene), and the area ratio of component A to component B was 50/50. High-pressure columnar water flow was injected at a pressure of 50 kg/cm² to the surface and backside of the fabric to split the splittable bi-component fibers and entangled the fibers.

By drying and simultaneously heat-bonding at 135° C., a dry laid type non-woven fabric of 20 g/m² of basis weight was manufactured.

Then, the dry laid type non-woven fabric was placed at the entrance side of a cylinder dryer of a wet laid paper machine in order to prepare a slurry of 0.5% concentration comprising the fibers described in Example 1, laminating the dry laid type non-woven fabric while wet laid processing to have a basis weight of 30 g/m², heat-treating at the cylinder dryer at 135° C. and bonding the thermal bonding fibers of both sides of the fabric.

High-pressure columnar water was injected at a pressure of 130 kg/cm² to the surface and backside of the composite fabric, splitting the splittable bi-component fibers and simultaneously heat-bonding at 135° C., followed by treating with corona surface discharge for four times respectively so that the total discharge amount was 0.462 kw·minute/m², and calendered by heated rollers.

COMPARATIVE EXAMPLE 1

A non-woven fabric for a battery separator was obtained in the same way as Example 1, except that the corona surface discharge treatment was not conducted.

COMPARATIVE EXAMPLE 2

A non-woven fabric for battery separator was obtained in the same way as Example 2, except that the corona surface discharge treatment was not conducted.

COMPARATIVE EXAMPLE 3

A non-woven fabric for a battery separator was obtained in the same way as Example 1, except that the ratio of the thermal bonding fiber was 20 weight % and the splittable bi-component fibers was 80 weight %.

COMPARATIVE EXAMPLE 4

A non-woven fabric for a battery separator was obtained in the same way as shown in Example 1, except that the fabric comprises 60 weight % of thermal bonding fibers, 10 weight % of splittable bi-component fibers and 30 weight % of synthetic fibers.

The physical properties of the battery separators in Examples 1–3 and Comparative Examples 1–4 are shown in Table 1.

As shown in Table 1, Examples 1 and 2 were excellent in initial and durable absorption height while maintaining the tensile strength and air permeability. In Example 3 using the same materials for wet and dry laid type non-woven fabrics as in Example 1, the tensile strength was remarkably improved while maintaining the initial and durable alkaline absorption height since the dry laid type non-woven fabrics have a reinforcement effect. In Comparative Example 2, the initial alkaline absorption height was improved by treating the non-woven fabric with a hydrophilic surfactant, however, the second or latter absorption was not observed.

TABLE 2

|  | Examples | | | Comparative Examples | | | |
| --- | --- | --- | --- | --- | --- | --- | --- |
|  | 1 | 2 | 3 | 1 | 2 | 3 | 4 |
| Cycle life (number) | 680 | 700 | 700 | 300 | 350 | 630 | 670 |
| Battery internal pressure (kgf/cm²) | 5 | 5 | 5 | 13 | 10 | 8 | 3 |
| Short circuit rate (number/100) | 2 | 3 | 0 | 3 | 3 | 2 | 10 |

As shown in Table 2, the predetermined amount of functional groups existed in Examples 1–3. As a result, unlike the case of surfactant treatment, the functional groups did not flow out from the fiber surfaces even after the separator was incorporated into a battery, but resided on the fiber surface semi-permanently. Therefore, no dry-out phenomenon (a phenomenon that a separator is partially not impregnated in an alkaline electrolyte) occurred, and the cycle life was good. Comparative Examples 1 and 2 were inferior in the durable alkaline absorption height, so a practical cycle life of the batteries was not obtained. In Comparative Example 3, the gaps among the separator fibers were small and sufficient air permeability was not obtained, so that internal pressure of the battery was increased. In Comparative Example 4, on the contrary, the short circuit rate was increased because the gaps among the fibers were too big.

A battery separator of this invention maintains tensile strength and air permeability while it has a non-woven fabric comprising fibers, and in the fibers present on the non-woven fabric surface, functional groups or bonds of —CHO or —C⁺H—O⁻, —CO—, and —COO— or —COO⁺ are formed. Therefore, the battery separator is superior in alkaline retaining property, initial alkaline absorption, and durable alkaline absorption, and also wettability with an alkaline electrolyte when incorporated into a battery, and

TABLE 1

|  |  | Examples | | | Comparative Examples | | | |
| --- | --- | --- | --- | --- | --- | --- | --- | --- |
|  |  | 1 | 2 | 3 | 1 | 2 | 3 | 4 |
| Functional | —CH—O, —C⁺H—O⁻ | 33.9 | 32.1 | 34.8 | 14.4 | 17.5 | 37.5 | 31.6 |
| groups | —C=O | 8.4 | 4.7 | 8.5 | 0 | 0 | 7.8 | 3.9 |
| (%) | —COO—, —COO⁻ | 4.3 | 0.2 | 4.0 | 0 | 0 | 9.4 | 2.8 |
| Thickness (mm) |  | 0.16 | 0.17 | 0.16 | 0.16 | 0.15 | 0.18 | 0.19 |
| Longitudinal tensile strength (kgf/5 cm) |  | 12.6 | 12.7 | 17.8 | 12.9 | 12.3 | 10.0 | 15.6 |
| Longitudinal elongation (%) |  | 15.1 | 14.8 | 20.5 | 14.7 | 15.2 | 33.9 | 8.2 |
| Air permeability (ccs) |  | 14.0 | 15.3 | 15.8 | 14.5 | 13.0 | 3.6 | 25.1 |
| Alkaline retaining rate (%) |  | 425 | 600 | 445 | 225 | 540 | 448 | 257 |
| Liquid | First (initial) | 124 | 158 | 137 | 5 | 145 | 117 | 87 |
| Absorption | Second | 23 | 44 | 28 | 0 | 0 | 30 | 15 |
| height (mm) | Third (durable) | 8 | 28 | 6 | 0 | 0 | 10 | 3 | thus, the battery life can be improved. The initial and durable hydrophilicity can be further improved by adhering hydrophilic surfactants on the non-woven fabric.

In addition, the battery separator can provide sufficient alkaline retaining property and alkaline absorption even with less corona surface discharge amount, which is also an advantage considering the running cost.

A battery assembled with the battery separator of this invention has great properties as a battery, and it is suitable for various alkaline storage batteries such as nickel-cadmium batteries, nickel-zinc batteries, nickel-hydrogen batteries.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A battery separator, comprising a non-woven fabric that comprises a mixture of staple fibers that are entangled and partially bonded to each other, the mixture of staple fibers comprising 15–75 weight % of ultra fine fibers having fineness of 0.1 to 0.5 denier split from splittable bi-component fibers comprising polyolefin polymer, component A, and polyolefin polymer containing oxygen atoms, component B, arranged adjacent to each other, 20–60 weight % of thermal bonding fibers and 0–50 weight % of single component synthetic fibers that have a greater fineness than that of the ultra fine fibers having fineness of 0.1 to 0.5 denier, wherein a surface of the non-woven fabric is modified by corona discharge, and functional groups are present in the fibers on the surface of the non-woven fabric and carbon atoms have said functional groups or bonds in the following ranges according to an analysis by using an electron spectroscopy of elemental composition on the non-woven fabric:

1. aldehyde groups (—CHO) or aldehyde bonds (—C$^+$H—O$^-$): 10–40%
  2. carbonyl groups or carbonyl bonds (—CO—): 3–30%
  3. carboxyl groups (—COO$^-$) or ester bonds (—COO—): 0–15%
  4. residual carbon atoms: 15–87%;

wherein the thermal bonding fibers are sheath-core bi-component fibers having a sheath of high-density polyethylene and a core of polypropylene, and wherein a longitudinal elongation of the battery separator is no more than 20%.

2. The battery separator according to claim 1, wherein the length of the ultra fine fibers, thermal bonding fibers and synthetic fibers ranges from 3 to 25 mm, and the fineness of said synthetic fibers is the same or less than that of the thermal bonding fiber.

3. The battery separator according to claim 1, having an air permeability in the range of 5 to 50 ccs.

4. The battery separator according to claim 1, having a third alkaline absorption height of at least 5 mm which is measured as follows, (a) initial alkaline absorption height being measured by the following steps of: collecting three sample pieces of dimension 25 mm×250 mm in the width direction and letting them reach moisture equilibrium; fixing the pieces with pins to horizontal bars that are supported at a predetermined level above a tank containing an aqueous solution of potassium hydroxide (KOH solution) with a relative density of 1.30 and kept at 20° C.; lowering the horizontal bars while arranging the lower ends of the pieces in a line so that the lower ends of the pieces are impregnated in the solution by 5 mm; and measuring after 30 minutes the height that the KOH solution rises because of capillary phenomenon;

(b) durable alkaline absorption height being measured by the following steps of: rinsing the sample pieces used for measurement of the initial or first alkaline absorption height with water for five minutes, dehydrating with a blotter, and air drying for about one hour; allowing the pieces to reach moisture equilibrium under an atmosphere of humidity of 65% at a room temperature of 20° C., and measuring the alkaline absorption height for a second time; and repeating the above operations and measuring the third or durable alkaline absorption height.

5. The battery separator according to claim 1, comprising a composite non-woven fabric formed by laminating fiber webs with different fiber length.

6. The battery separator according to claim 1, wherein at least one other sheet is laminated on at least one layer of the non-woven fabric.

7. The battery separator according to claim 1, wherein the component B is at least one polymer selected from the group consisting of ethylene vinyl alcohol copolymer, ethylene-(meth)acrylate copolymer, ethylene-(meth)acrylic acid copolymer and ethylene-vinyl acetate copolymer.

8. A method for manufacturing a battery separator comprising the steps of: mixing and wet laid processing 15–75 weight % of splittable bi-component fibers 3–25 mm long comprising polyolefin polymer, component A, and polyolefin polymer containing oxygen atoms, component B, arranged adjacent to each other, 20–60 weight % of thermal bonding fibers 3–25 mm long, and 0–50 weight % of single component synthetic fibers that have greater fineness than that of ultra fine fibers formed by splitting said splittable bi-component fibers and that have the same or smaller fineness than that of said thermal bonding fibers in order to form a wet laid type non-woven fabric, and wherein the thermal bonding fibers are sheath-core bi-component fibers having a sheath of high-density polyethylene and a core of polypropylene;

splitting the splittable bi-component fibers to form ultra fine fibers and to entangle the fibers in at least one step selected from the group consisting of the wet laid process and a step following the formation of the wet laid type non-woven fabric; and treating both the surfaces of the non-woven fabric with corona surface discharge and calendaring by heated rollers, and wherein the corona surface discharge is applied so that functional groups are present in the fibers on the surfaces of the non-woven fabric and carbon atoms have said functional groups or bonds in the following ranges according to an analysis by using an electron spectroscopy of elemental composition on the non-woven fabric:

1. aldehyde groups (—CHO) or aldehyde bonds (—C$^+$H—O$^-$): 10–40%
2. carbonyl groups or carbonyl bonds (—CO—): 3–30%
3. carboxyl groups (—COO$^-$) or ester bonds (—COO—): 0–15%
4. residual carbon atoms: 15–87%.

9. The method for manufacturing a battery separator according to claim 8, wherein the splittable bi-component fibers are split by the impact provided by the stirring in the wet laid process.

10. The method for manufacturing a battery separator according to claim 8, wherein the splittable bi-component fibers are split by high-pressure water flow treatment.

11. The method for manufacturing a battery separator according to claim 8, wherein the split-formed ultra fine fibers are entangled by high-pressure water flow treatment.

12. The method for manufacturing a battery separator according to claim 8, wherein the splitting of the splittable bi-component fibers and the entanglement of the formed ultra fine fibers are conducted simultaneously by high-pressure water flow treatment.

13. The method for manufacturing a battery separator according to claim 8, wherein the total discharge amount to treat the surfaces of the non-woven fabric with the corona surface discharge ranges from 0.05 to 5 kW·minute/m$^2$.

14. The method for manufacturing a battery separator according to claim 8, wherein a hydrophilic surfactant is applied to the non-woven fabric after the corona surface discharge treatment.

15. The method for manufacturing a battery separator according to claim 8, wherein the component B is at least one polymer selected from the group consisting of ethylene vinyl alcohol copolymer, ethylene-(meth)acrylate copolymer, ethylene-(meth)acrylic acid copolymer and ethylene-vinyl acetate copolymer.

16. A battery assembled with a battery separator comprising a non-woven fabric that comprises a mixture of staple fibers that are entangled and partially bonded to each other, the mixture of staple fibers comprising 15–75 weight % of ultra fine fibers having fineness of 0.1 to 0.5 denier split from splittable bi-component fibers comprising polyolefin polymer, component A, and polyolefin polymer containing oxygen atoms, component B, arranged adjacent to each other, 20–60 weight % of thermal bonding fibers and 0–50 weight % of single component synthetic fibers that have a greater fineness than that of the ultra fine fibers having fineness of 0.1 to 0.5 denier, wherein a surface of the non-woven fabric is modified by corona discharge, and functional groups are present in the fibers on the surface of the non-woven fabric, and carbon atoms have said functional groups or bonds in the following ranges according to an analysis by using an electron spectroscopy of elemental composition on the non-woven fabric:

1. aldehyde groups (—CHO) or aldehyde bonds (—C$^+$H—O$^-$): 10–40%
2. carbonyl groups or carbonyl bonds (—CO—): 3–30%
3. carboxyl groups (—COO$^-$) or ester bonds (—COO—): 0–15%
4. residual carbon atoms: 15–87%;

wherein the thermal bonding fibers are sheath-core bi-component fibers having a sheath of high-density polyethylene and a core of polypropylene, and wherein a longitudinal elongation of the battery separator is no more than 20%.

\* \* \* \* \*